(12) United States Patent
Newth

(10) Patent No.: US 11,407,014 B2
(45) Date of Patent: Aug. 9, 2022

(54) DUCT-CLEANING DEVICE AND METHOD

(71) Applicant: Gregory Lee Newth, Montague, MA (US)

(72) Inventor: Gregory Lee Newth, Montague, MA (US)

( * ) Notice: Subject to any disclaimer, the term of this patent is extended or adjusted under 35 U.S.C. 154(b) by 218 days.

(21) Appl. No.: 16/171,319

(22) Filed: Oct. 25, 2018

(65) Prior Publication Data

US 2019/0118230 A1    Apr. 25, 2019

Related U.S. Application Data

(60) Provisional application No. 62/576,784, filed on Oct. 25, 2017.

(51) Int. Cl.
    *B08B 9/043*      (2006.01)
    *B08B 9/045*      (2006.01)

(52) U.S. Cl.
    CPC ............ *B08B 9/0436* (2013.01); *B08B 9/045* (2013.01); *F24F 2221/22* (2013.01)

(58) Field of Classification Search
    CPC ....... B08B 9/045; B08B 9/0436; B08B 9/043; F24F 2221/22; F16D 1/108; F16D 1/10; F16B 7/042; F23G 3/04; F23J 3/026
    USPC ........................................ 15/104.33, 104.066
    See application file for complete search history.

(56) References Cited

U.S. PATENT DOCUMENTS

| | | |
|---|---|---|
| 1,783,256 A | 12/1930 | Miller |
| 5,617,609 A | 4/1997 | Bently |
| 5,745,948 A | 5/1998 | Lloyd |
| 5,813,089 A | 9/1998 | Nolan |
| 5,819,354 A | 10/1998 | Alonso |
| 8,312,572 B2 | 11/2012 | Heffner |
| 9,637,909 B1 | 5/2017 | Penny |
| 2006/0249177 A1 | 11/2006 | Guajaro |
| 2008/0000040 A1 | 1/2008 | Peterson |
| 2010/0306954 A1 | 12/2010 | Coscarella |
| 2016/0348370 A1 | 12/2016 | Newth |

FOREIGN PATENT DOCUMENTS

| | | | |
|---|---|---|---|
| BE | BE 940 460 C | 3/1956 | |
| CN | 107 282 561 A | 10/2017 | |
| DE | 89038 C | 10/1896 | |
| EP | 1522743 A1 * | 4/2005 | ............... F16B 7/18 |
| FR | 401088 | 8/1909 | |

(Continued)

OTHER PUBLICATIONS

International Search Report, Application No. PCT/US18/57612, dated Feb. 11, 2019.

(Continued)

*Primary Examiner* — Laura C Guidotti

(74) *Attorney, Agent, or Firm* — C. Nessler

(57) ABSTRACT

A device for cleaning a duct comprises a rotating whip head, the filaments of which flail the interior of the duct as the head is moved lengthwise by a flexible shaft comprised of segments which are attached to each other by disengageable two-part couplings. Proximal and distal ends of a whip head, and the proximal ends of coupling parts are provided with rake features that provide inclined plane surfaces, enabling the rotating devices to avoid hanging up on steps and edges within the duct.

18 Claims, 8 Drawing Sheets

(56) References Cited

FOREIGN PATENT DOCUMENTS

GB           2231380     11/1990
WO    WO 2015/193793    12/2015

OTHER PUBLICATIONS

English Machine Translation of FR401088.
"European Supplementary Search Report and Search Opinion" Application No. EP 18 87 0035, dated Jul. 8, 2021 (11) Pages.
English Machine Translation of Patent CN 107 282 561, dated Jul. 8, 2021 (7) Pages.

* cited by examiner

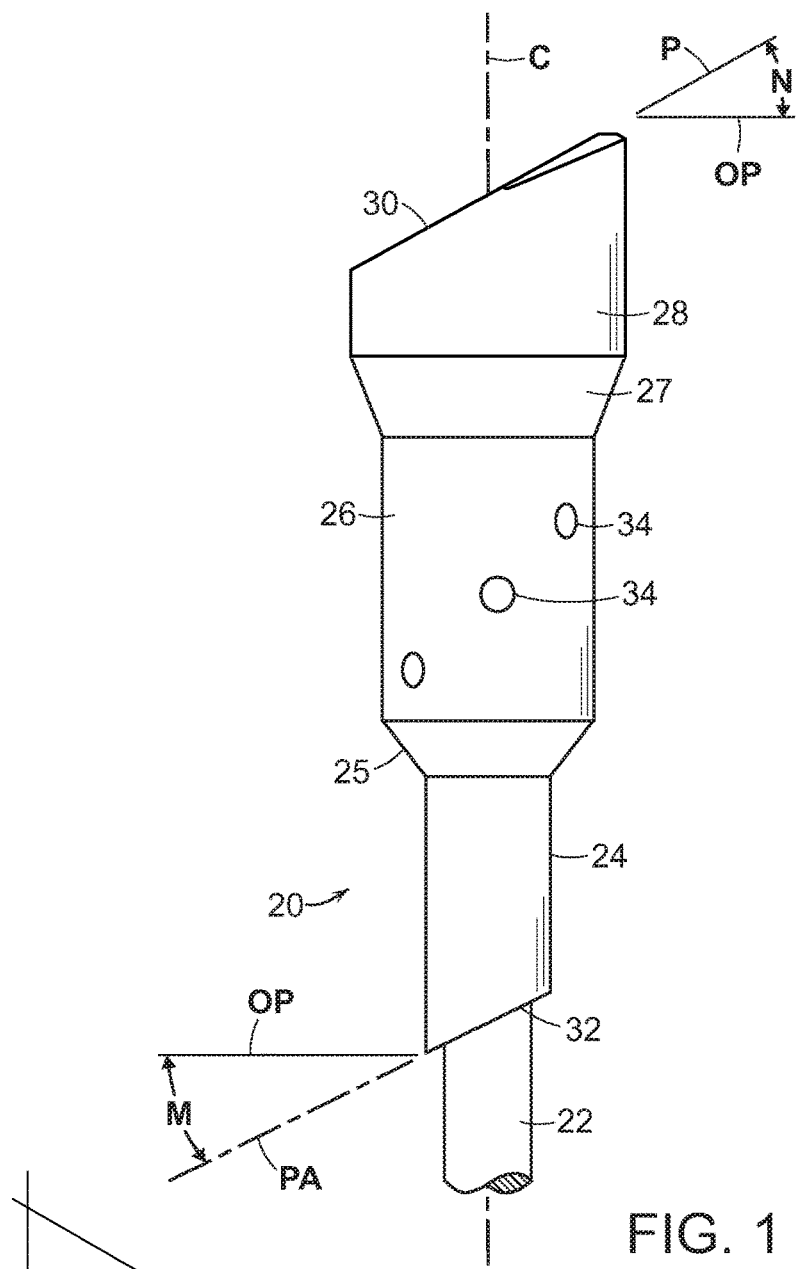
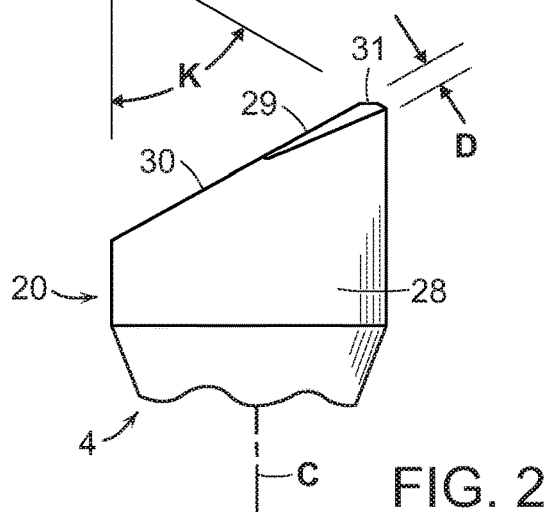
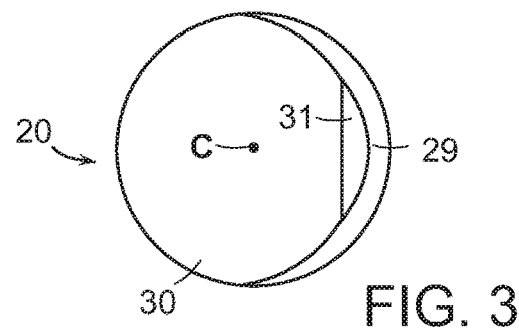
FIG. 1
FIG. 2
FIG. 3

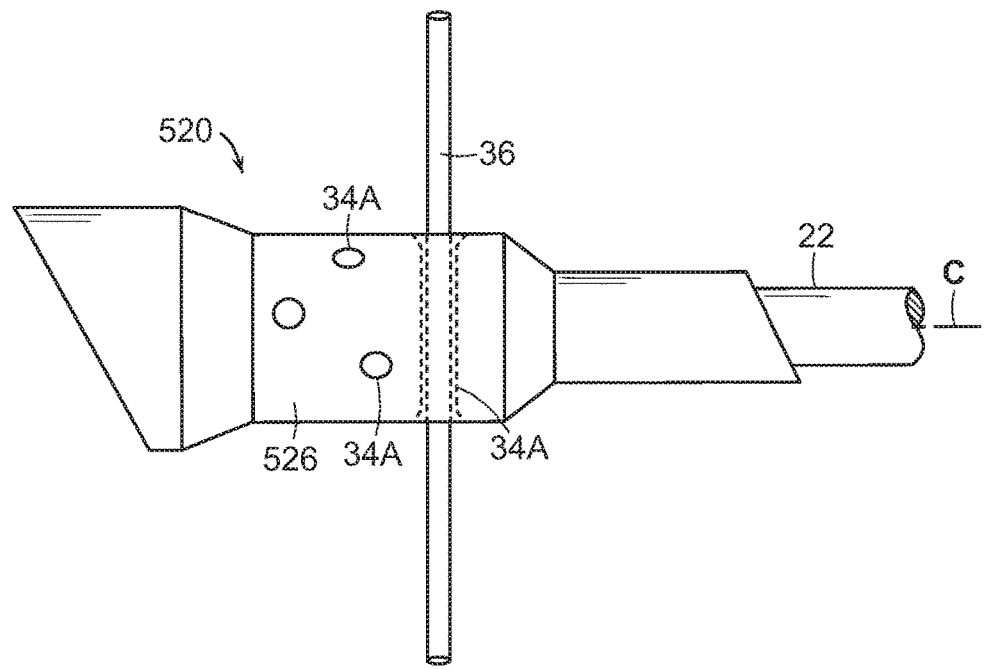
FIG. 13
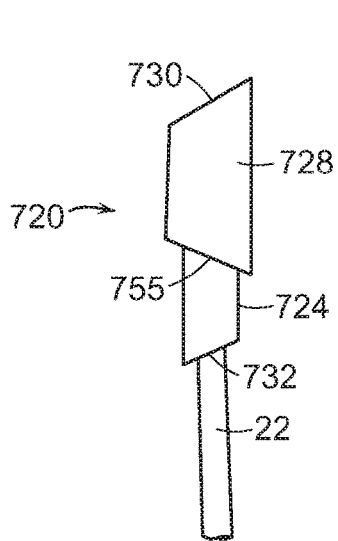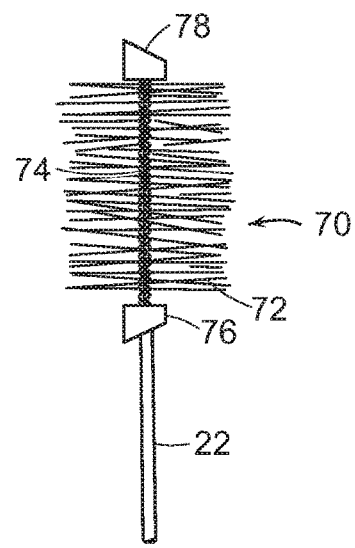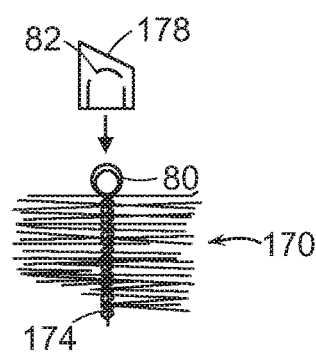
FIG. 14  FIG. 15  FIG. 16

DUCT-CLEANING DEVICE AND METHOD

The present invention claims benefit of provisional patent application Ser. No. 62/576,784, filed Oct. 25, 2017, the disclosure of which is hereby incorporated by reference.

TECHNICAL FIELD

The present invention relates to devices and methods for removing deposits from the interior of air ducts and other conduits.

BACKGROUND

Lint and clinging debris accumulate on the interiors of ducts that are associated with air movement in air conditioning systems. To remove such deposits, it is common for a mechanic to run a tool along the length of the duct from an access point. In general, mechanics use snakes, i.e., flexible light steel or plastic shafts, to push a tool—mostly called here a head—along the length of a duct. In the prior art, different kinds of heads have been used, according to the kind of duct and the nature and severity of deposit.

To clean air ducts it is common to use brushes and other tools which primarily are pushed and pulled lengthwise within the duct, and which optionally may be manually rotated. One familiar head is a flail like device which has replaceable flexible plastic filaments extending radially. Another device that is used is a familiar spiral-wound steel shank brush having fibers of plastic or metal wire. In the cleaning process, the head device is rotated at a moderate speed and pushed down the duct length by means of a rotating flexible shaft to which the device is attached.

Some ducts may be many meters long and may have changes in direction and diameter, as well as having other dimension changes, resulting in which is generally called here "steps" along the duct length. For example, steps may be present where the somewhat spaced apart ends of two duct sections are mated by means of an exterior coupling (as in common for plastic ducts); or where the necked down end of one duct section is set within the normal size end of an abutting duct section (as is common for sheet metal ducts). Other steps are present where a first duct enters a larger second duct or where a duct enters a plenum, or where a duct terminates at a wall opening.

A continuing problem for mechanics has been that a duct-cleaning tool or its associated shaft will become "hung up" on a step, even when the step seems to be small. In one instance, it is not unusual that a mechanic will find that he is unable to push the tool further down the duct. In another instance, a mechanic pushes the tool down the duct but finds that he is unable then to pull it back to the access point. If a mechanic pushes or pulls hard to free a whip head type of tool while rotating it, the mechanic risks wearing a hole in the duct, particularly when the duct is made of plastic and the tip of the whip head has features which act to cut the duct.

Prior art whip heads have been fitted with conical shape ends and sphere-like features. Old-style wire-wound brushes often have large flat-loop ends. But it is a commonly heard complaint of mechanics that the problem of "hanging up" has not been sufficiently overcome. One apparent reason is because there are conflicting needs that limit how a head, particularly a whip head, can be shaped. Those limitations include that a head should be short in length for maneuverability within a duct and that the body should be sufficiently big to hold the filaments. Also, the proximal end of the head, i.e., the shank end where it is attachable to a shaft, a head has to be substantial enough to enable means for securing the head to the shaft. For example, a shank should not crack if it is swaged to a shaft; and a shank has to have adequate wall thickness when shaft-clamping screws are used.

SUMMARY

An object of the present invention is to overcome "hang ups" of heads and shaft couplings on steps and other features within a duct, when cleaning ducts using heads which are moved linearly while rotating within the duct, while meeting the other needs mentioned in the Background. A further object is to have a compact head without features that will inadvertently cause cutting or other damage to a duct interior. A further object is to have a whip head and other hang-up resisting head that is durable and economic to manufacture.

In embodiments of the invention, a device such as a head or a coupling has a rake at one end at least. The rake comprises a surface that is inclined relative to the lengthwise axis of the device and of the shaft to which the device is attached during use. Such rake surface enables the device to climb over a step in the duct as the device is moved lengthwise within the duct during cleaning. In embodiments of the invention, the surface of a rake extends partially or fully across the width of a device.

In coupling embodiments, where two fittings are disengagingly held together by buttons, there is a rake at the proximal end of one or both fittings, where the proximal end is the end where the shaft is attached. Preferably the rake runs only about half way across the fitting, to a perpendicular or butt end.

In whip head embodiments, where the body of the fitting holds filaments that flail the interior of duct during use, a first rake extends partially or fully across the distal end of the head, which is the end that ordinarily enters a duct first and is furthest from the shank end that is attached to a shaft. The first rake preferably runs at an angle of 20 to 30 degrees to the longitudinal axis of the whip head; and there is a bevel at the most distal portion of the first rake. Preferably the head also has a second rake at the shank or proximal end, which rake is similar to that which is used on a fitting of a coupling.

A device for cleaning a duct comprises a rotating whip head, the filaments of which flail the interior of the duct as the head is moved lengthwise by a flexible shaft comprised of segments which are attached to each other by disengageable two-part couplings. Proximal and distal ends of a whip head, and the proximal ends of coupling parts are provided with rake features that provide inclined plane surfaces, enabling the rotating devices to avoid hanging up on steps and edges within the duct.

The invention alleviates the tendency for heads and shaft couplings to become hung up on steps and other features within ducts and meet other objects of the invention. The invention may be applied to devices that are suitable for different sizes of ducts. Whip heads and brush heads having invention features may be used with shaft which have no couplings or couplings other than those within the scope of the present invention. The features and advantages of the present invention will become apparent from the following description of preferred embodiments and accompanying drawings.

BRIEF DESCRIPTION OF THE DRAWINGS

FIG. 1 is a side view of a whip head having canted end surfaces, an embodiment of the present invention.

FIG. 2 is a side view of the whip head of FIG. 1.

FIG. 3 is a view along the C axis of the whip head of FIG. 2 showing the distal end.

FIG. 13 is a side view of a head with a filament inserted in one of a multiplicity of passageways that are shaped to receive filaments.

FIG. 14 is a side view of a head with canted ends where the head has no filaments.

FIG. 15 is a side view of a brush head, showing the head which has a tip (distal end) and shank ring (proximal end), both of which have canted surfaces facing away from the body of the brush head.

FIG. 16 is a exploded partial side view of a brush head like that shown in FIG. 16, where a wire ring at the distal end receives a nub having a canted proximal end surface.

DESCRIPTION

Figure 4:
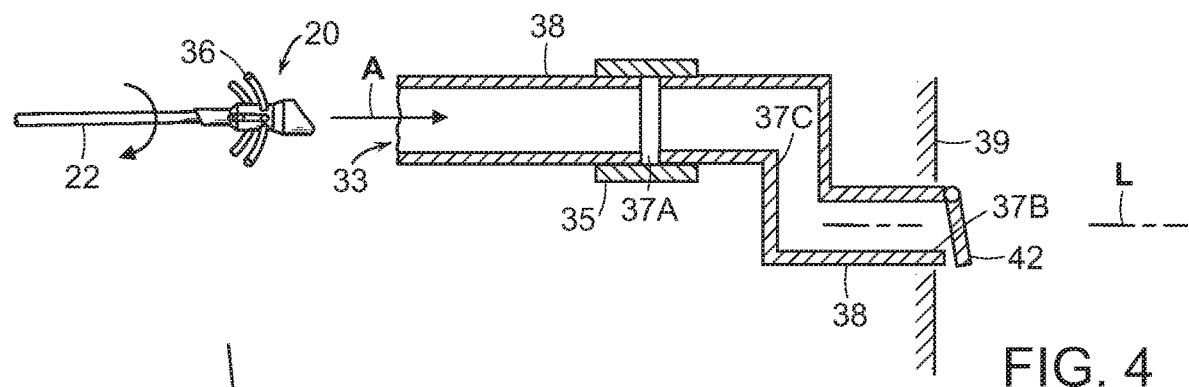
FIG. 4 is a cross section view of a duct portion that terminates at a building wall, showing steps within the duct at the duct terminus, and showing how a whip head on the end of a shaft is inserted into the duct.

The present invention generally comprises devices, sometimes called tools, suited for use in cleaning ducts and conduits. One device, which is often called a whip head, or simply a head, is mounted for use on the end of a shaft which is comprised of a multiplicity of sections that are interconnected connected by couplers. FIG. 1 shows whip head embodiment 20, mounted for use on the end of a flexible shaft 22. Head 20 is ready to be inserted into a duct (conduit) 38, as shown in FIG. 4. A plurality of transverse passageways 34 in the head are shaped to receive filaments which are often thin plastic fibers of about 0.08 to 0.20 inch (about 2 to 5 mm) in diameter. Filaments may also comprise braided stainless steel wires cables. For clarity of illustration filaments are omitted in most figures. Filaments 36 are shown in head 20 in FIG. 4. Also see FIG. 13.

A shaft, sometimes referred to as a rod, is typically a long round cross section member which is commercially available, being variously made of polymer-fiberglass, metal or another material. As an example, for cleaning smaller diameter ducts, a shaft diameter may be one-quarter to seven-eighths inch (about 6 to 22 mm), according to the size of head and associated duct. A shaft used in duct cleaning most often is comprised of a multiplicity of segments joined together end to end by couplers. In the present invention a preferred kind of coupler comprises a first fitting and a second fitting which are held to each other by at least one, more typically two spring loaded buttons; and the exterior of the coupler is circular or near-circular. Below, heads are first described; then couplers are described.

In FIG. 4 and in other figures an arrow A illustrates how a whip head may be moved along the length of the interior of a circular duct which is shown in cross section. To clean a duct 38 from an access point such as an opening 33 at the end of the duct, a user (e.g. a mechanic or a technician) pushes on flexible shaft 22 that is attached to the head 20. Shaft 22 is simultaneously rotated by a rotary tool/driver (not shown) that is held by or controlled by the user at the access point.

Rotation of head 20 causes the free ends of flexible filaments 36 to extend radially outward due to centrifugal force, thereby to rub and flail the bore of the duct, thereby dislodging debris on the interior wall of the duct. Loosened debris can be extracted from the duct by simultaneous or subsequent induced air flow in the duct, typically by a vacuum cleaner or other suction device.

The following describes problems which the present invention overcomes by describing what happens to prior art whip heads and other types of heads. Ducts shown in the Figures may be assumed to be circular in cross section but this description applies to other shape cross section ducts.

Often ducts will have one or more steps along the duct length. For example, in FIG. 4, duct 38 has step 37A associated with a circumscribing groove that is present in the gap between the ends of two plastic duct section which are coupled by coupling sleeve 35. There is another illustrative step 37C where the duct changes direction. There is another exemplary step 37B where the duct passes through an opening in wall 39 of a building.

A common hinged flap cover 42 on the end of the duct 38 is shown at the wall opening of FIG. 4. The lower edge of the free end of the flap 42 presents as another step feature upon which a prior art head can hang up after the head has exited the duct and the mechanic seeks to pull the head back to the access point. (If there is a hang up on the flap door, the mechanic may have to go to the location of flap 42 and remove the head from the shaft so the shaft can be pulled back, or may have to pull the whole of the head and shaft 22 from the opening in the downstream direction. Almost needless to say, this is inconvenient and time consuming.)

Brush type heads 70, 170, as shown in FIG. 15, can also be prone to hang up, particularly when being pushed down a duct.

Figure 5:
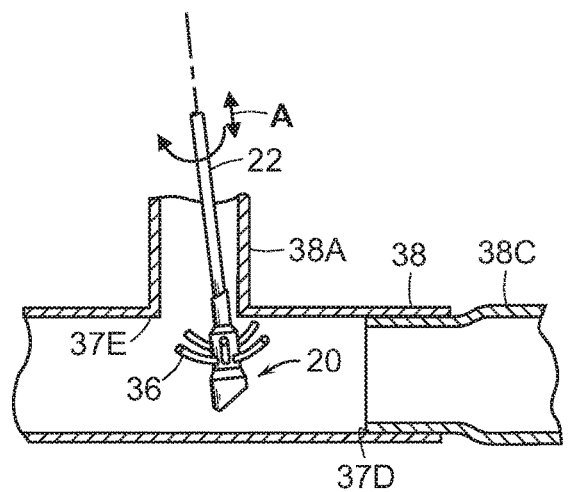
FIG. 5 shows a tee-joint duct cross section with a whip head within a duct portion.

FIG. 5 shows another cross section of duct 38A and how it intersects duct 38. FIG. 5 also shows how duct section 38C has a necked down end that sets within the bore of duct section 38, thereby creating step 37D. Head 20 is shown after it has been inserted into duct 38A. If the head lacks features of the present invention and if the head is pushed further as illustrated in FIG. 5, it could damage the wall of duct 38 when its distal end hits the wall opposite the opening of duct 38A.

Also, still referring to FIG. 5, if the head is a prior art head there is a risk of the head becoming hung up on step 37D as the head is pushed along duct 38. Further, a prior art head that is pulled backward from duct 38 into duct 38A, may become hung up on step 37E. Thus same adverse results can occur with respect to couplings.

As described in detail below, when the proximal-end and distal-end surfaces are canted (raked)—i.e., when the surfaces are inclined at an other-than-perpendicular angle to the length axis of the head or coupler part (which length axis co-aligns with the length axis of any attached shaft portion), that enables a head which is being pushed into or retracted from a duct to "climb over" steps or other discontinuities along the length of a duct.

Referring again to FIG. 1, whip head embodiment 20 comprises a body having a shank portion 24, mid-body portion 26, and tip portion 28. The tip is at the distal end of the head (i.e., the upper end of the head as shown in the FIG. 1). The shank is at the proximal end of the head (i.e., the lower end of the head as shown in FIG. 1). Preferably, all the three portions 24, 26, 28 are substantially circular in cross section; alternatively they may be non-circular. In the exemplary FIG. 1 embodiment, the diameter of each portion, compared to the adjacent portion, increases with distance from the proximal end, as shown. And conical transition portions 25 and 27 respectively connect the shank to the mid-body and the mid-body to the tip. Alternatively stated, in this embodiment of the invention, mid-body 26 of head 20 has an external diameter which is intermediate the diameters of tip 28 and shank 24; and shank is the smallest of the three. In another useful embodiment, the mid-body and tip have the same diameter. Still other embodiments are described below.

Head 20 is mounted on the end of shaft 22 and the longitudinal axis C of the head aligns with the length axis of the shaft. Shank 24 has a bore for receiving shaft 22 which is secured to the shank by swaging of the shank or by use of fasteners (not shown) or adhesive.

The end of shank 24—and thus the proximal end of the head—comprises rake 32, a portion of an inclined annular surface. Rake is a common machinist term; it is familiarly used to describe a surface feature of a single point tool, such as might be used in a lathe. In this application, rake refers to the portion of a surface at the end of a device such as a head or a coupler part, which surface runs along a plane or a best-fit plane that is angled to the lengthwise axis of the device. As a corollary, a rake may be characterized as being angled with respect to the longitudinal center plane and to a diametrical plane of the device. Rake may also be referred to herein as a canted surface or an inclined surface, where the canting or inclination is with reference to the axes/planes just mentioned.

Referring further to FIG. 1 rake 32 lies along plane PA which is inclined relative to a plane OP which is perpendicular to the longitudinal axis C of the head. At its most acute angle to the lengthwise axis L, plane PA of the surface of rake 32 has an angle M, where M is preferably about 10 to 45 degrees, more preferably about 30 degrees. The tip 21 of the surface of rake 32 may have the same kind of features which are associated with the tip of surface of rake 30, described below.

The proximal end canted surface or rake 32 enables head 20 to avoid being hung up on a step when the head is pulled by the shaft backward toward the mechanic. It is found that the invention head 20 will "climb over" a step due to the canted surface 32, compared to a prior art head where the surface of the distal end of the shank lies substantially along plane OP or where there is some other not-canted surface. Surprisingly, a fitting which has a small circumscribing edge that runs perpendicular the length axis of the attached shaft can cause a hang-up on a step. It is undesirable to change such an edge into a conical surface that ends in a circular knife edge because during use such an edge is susceptible to deformation which will result in hang up.

Tip 28 of the head 20 embodiment has a canted surface comprising rake 30 at the distal end of the head. Rake 30 comprises a preferably planar surface which lies in plane P which is inclined at an angle N relative to a plane OP which is perpendicular to the longitudinal axis C of the head. Angle N is greater than about 10 degrees; preferably in the range 20 to 45 degrees, more preferably about 30 degrees.

The partial side view of FIG. 2 and the distal end view of FIG. 3, both of head 20, show more detail of the tip portion 28 of head embodiment 20. The outermost portion of the tip comprises a bevel 29 and a flat 31. Both bevel 29 and flat 31, both being preferred features that are aimed at mitigating any unintended cutting effect which the rake end might have, particularly on ducts which are made of soft and/or thin materials. However, it can be practical to omit such refinements.

Preferably, bevel 29 runs more than about one quarter, and not much more than about one half, of the way around the periphery of surface 30. It is undesirable to run a bevel 29 all around the edge of a rake surface 30 because that lessens the effectiveness of the head in getting over steps. An exemplary bevel 29 on a head with a tip portion that has an about 0.8 inch diameter (about 20 mm) has a width D of about 0.18 inch (about 4.5 mm) at its widest portion, prior to the machining of flat 31. A preferred bevel 29 is a portion of a straight-sided conical surface that runs at angle K to lengthwise axis C. See FIG. 2. An exemplary angle K is 60 degrees. In another embodiment, angle K might be that angle which makes the bevel intersect the surface 30 and the cylindrical side of the tip at the same angle. Bevels 29 which approximate such conical surface are within contemplation; for example the bevel may be a compound-angle surface; or bevel 29 may be a curved surface, so the edge marked with dimension D in FIG. 2 would appear as a curve.

Exemplary flat 31 for the 0.8 inch (about 20 mm) diameter head may be about 0.05 inch (1.3 mm) maximum width by about 0.4 inch maximum length when viewed as in FIG. 3. While surface 31 is most easily made as a planar surface running perpendicular to the length axis of the head, in the generality of the invention, other angles may be used, and the surface 31 may be non-planar. Having bevel 29, preferably augmented by surface 31, lessens the risk that head 20 would have a cutting action if it hits a wall or step in a vulnerable duct or associated part. See FIG. 5 that illustrates how there is a chance for such bad situation to happen, if the head continues on the path suggest by the Figure.

As mentioned above, a like bevel may be put at the shank end rake surface. Presently, it is thought to be somewhat less necessary to have a bevel on the shank end rake because the pulling action of the shaft seems to make the proximal end of the head less prone to "digging into" the wall of a duct. Those features which characterize the ends of the below-described couplings may also be applied the shank of a head.

Figure 3A:
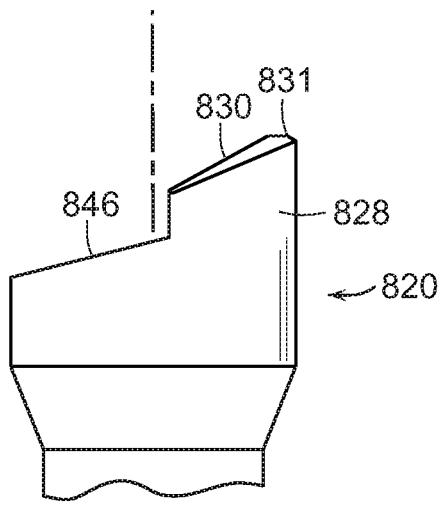
FIG. 3A is a side view of an alternative embodiment of whip head.
Figure 3B:
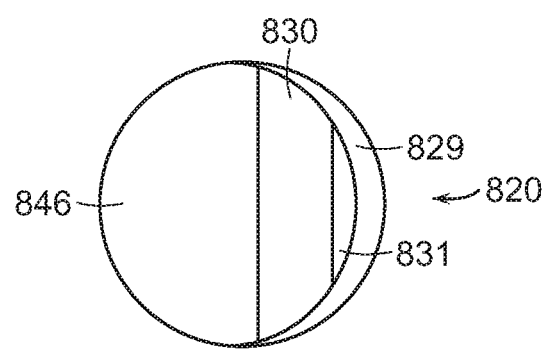
FIG. 3B is a view along the C axis of the whip head of FIG. 3A showing the distal end.

FIG. 3A and FIG. 3B show respectively in side and end view head 820 which is like head 20 except that a portion of the rake end 830 of tip 828 has been "cut away", leaving surface 846 which is shown as a plane which runs at an oblique angle to the lengthwise axis of the head, but which optionally may run at right angle or might alternatively be non-planar.

Figure 6:
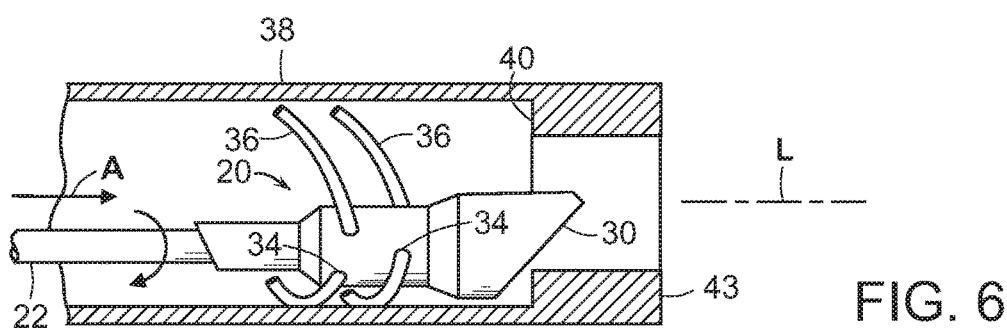
FIG. 6 is a cross section of a duct showing the distal end of a whip head in contact with a step within a duct.
Figure 7:
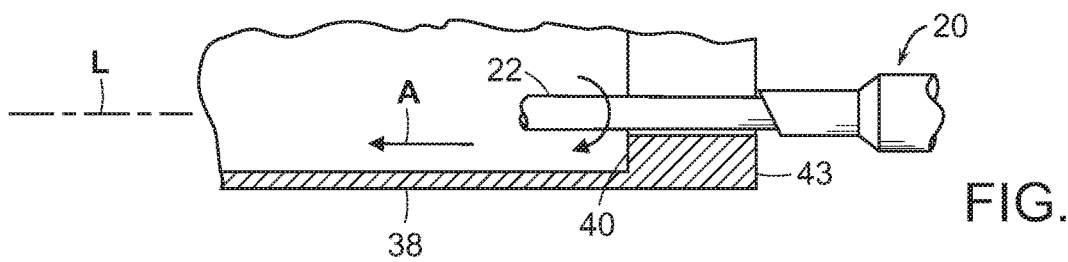
FIG. 7 is a partial cross section of a duct showing the proximal end of a whip head about to contact a step at the end of the duct and the head is being pulled backward into the duct.

FIG. 6 shows head 20 as it is being pushed along length axis L of duct 38, and how it encounters step 40, where the duct becomes smaller in diameter. With further pushing on the shaft the invention features aid the rotating head 20 in climbing over step 40. FIG. 7 shows head 20 as it is being pulled back along the length axis L of duct 38, and as it is about to come in contact with step 43. Further pulling will cause the rotating head 20 to climb over step 43. Further pulling will cause the rotating head to climb over step 43. While having inclined/rake surfaces at both the distal end and the proximal end of a head are most desirable, in alternative special embodiments of the invention only one of the two ends may have an inclined/rake surface.

When a head is rotated by means of shaft 22, the centrifugal force causes the filaments to extend outwardly and rub against the interior surfaces of a duct. That can result in irregular force on the filaments, and the filaments might tend to be pulled away from the head. An embodiment of head has a body which comprises through-holes 34 (also called passageways) for receiving plastic filaments 36, as shown in FIG. 13, discussed below. Alternatively, the head has pockets or blind cavities in the cylindrical (side) surface of the body, and each filament is secured within such by a screw or cam lock, as will be familiar prior art to an artisan.

Figure 8:
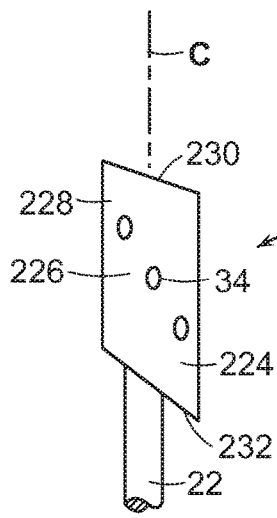
FIG. 8 is a side view of a whip head having a constant diameter exterior and canted opposing end surfaces.

FIG. 8 shows alternative embodiment head 220 which has a shank portion 224, mid-body portion 226, and tip portion 228, all having the same diameter. (In a variation the portions may have differing diameters.) Both the distal tip surface 230 and the proximal tip surface 232 are planar and are inclined with respect to an axis perpendicular to longitudinal axis C. While FIG. 8 and certain other pictures show the distal end rake and proximal end rake running angularly in the same sense—i.e., they have a semblance of parallelism, in the generality of the invention the rake at one end may be oriented randomly to the rake at the opposing end, since it does not seem to make any performance difference.

An inclined distal surface and an inclined proximal surface may be other than planar and heads having such rake surfaces will be within the scope of the claimed invention, providing a benefit in head movement along a duct in the same way as described just above. For example, a claimed rake may have surfaces such as steps or undulations, including minor size flats, the multiplicity of which generally lie along an inclined or canted best-fit plane. Portions, and even the whole, of the rake surface may be curved (i.e., dished in or out). In the embodiments, the rake surface has a best fit plane intersects with and is angled with respect to the head longitudinal axis C. The following are some examples.

Figure 9:
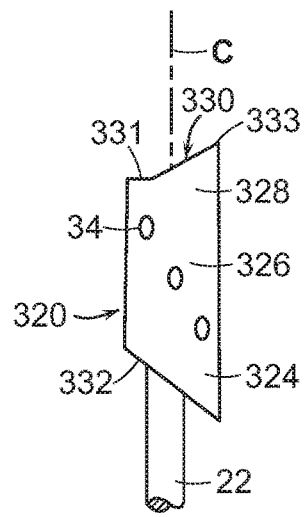
FIG. 9 is a side view of a whip head having a constant diameter exterior and canted opposing end surfaces, where the distal end surface further comprises a flat portion that is not canted.
Figure 9A:
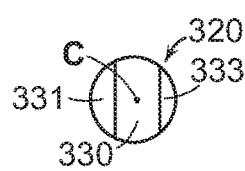
FIG. 9A is a distal end view of the head shown in FIG. 9.

FIG. 9 shows alternative embodiment head 320 which has a shank portion 324, mid-body portion 326, and tip portion 328, all having the same diameter. (In a variation the portions may have differing diameters.) FIG. 9A is a view of the distal end of the head 320 (i.e., the top end, in the FIG. 9). Proximal surface 332 is a canted plane, like that of head 220. The distal end surface 330 comprises two portions: surface portion 331 which runs substantially perpendicular to the longitudinal axis C; and intersecting canted planar portion 333.

Figure 10:
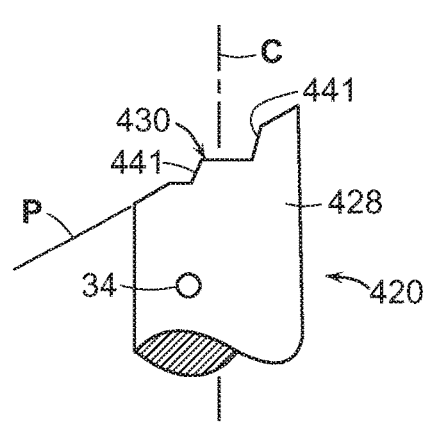
FIG. 10 is partial view of the side of a head showing a canted distal end surface which comprises steps.
Figure 10A:
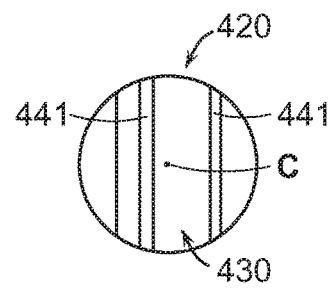
FIG. 10A is a distal end view of the head shown in FIG. 10.

FIG. 10 shows a portion of alternative embodiment head 420. FIG. 10A is a view of distal end of the head (i.e., the top of the head) of FIG. 10). Tip surface 430 is generally canted; but in this embodiment the surface 430 comprises a plurality of steps 441 that lie generally along a canted plane P. In other embodiments not shown, the inclined distal or inclined proximal surface may comprise undulations other than the nominally well-defined steps shown in FIG. 10.

Figure 11:
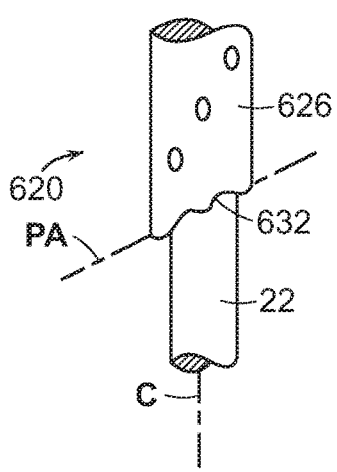
FIG. 11 is a side view of a portion of a head showing a portion of the shank portion, where the proximal end has a canted surface comprised of undulations.

FIG. 11 shows in side view the shank 626 portion only of head embodiment 620, where the rake surface 632 comprises undulations. The undulations lie along mean plane PA of the rake surface, which is angled with respect to head longitudinal axis C.

Figure 12:
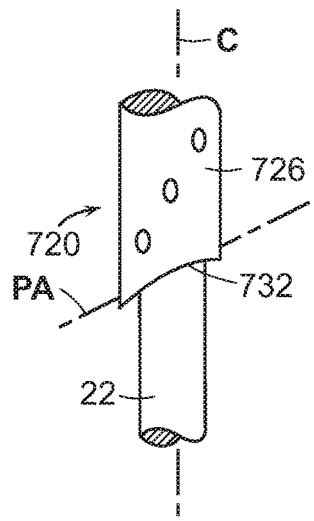
FIG. 12 is a side view like that of FIG. 11, showing a head having a canted proximal end surface that is curved to have a nominal dish shape.

FIG. 12 shows in side view the shank 726 portion only of embodiment head 720, where the rake surface 732 is curved; in particular surface 732 is dished. Surface 732 has a best fit plane PA that cants from an intersection with head longitudinal axis C. In an alternative analogous embodiment, the surface may be bellied out, i.e., the surface 732 is a generally convex section when viewed from the proximal end.

In other embodiments of the invention, the variations which have been described for the one end may be embodied in the other end. In the FIGS. 8-12 embodiments, during use a head will have filaments inserted in the filament holes. As mentioned above, they are omitted for clarity of illustration.

FIG. 13 shows an embodiment of head 520 which is like head 20. Head 520 comprises a plurality of straight passageways 34A in the mid-body portion 526, shaped so that through each a filament 36 may run. Preferably, there are at least 3 passageways and associated filaments. Only one filament is shown in FIG. 13. The filaments may be secured in the passageways by known ways, including set screws. Other means within the passageway for creating resistance to lengthwise motion may be used. Filaments may be attached to a head in other ways than being run into through-passageways.

Referring to the above, by way of describing the foregoing invention in some alternative language: A whip head is a device which has rake features at one or both ends, to enable the head to overcome steps inside a duct. A head comprises a mid-body portion and a shank portion at the proximal end of the device and they are connected or integral, being arranged along the longitudinal axis. The shank portion at the proximal end comprises a first rake, which first rake comprises a surface running at an oblique angle to the longitudinal axis.

In embodiments of the invention, there is a tip portion integral with or connected to the mid-body portion. The tip portion comprises a second rake which is part of the distal end of the device and which comprises a surface running at an oblique angle to the longitudinal axis. In embodiments of the invention, a head device has a rake at least at the distal end; and the tip portion has an exterior surface with a substantially circular cross section where the tip connects to the mid-body. The circular cross section runs to the second rake which has a surface that runs to a nominally circular intersection with said exterior surface; and there is a bevel running around half or less of said intersection. When there is a flat at the distal end, the flat modifies the intersection between the bevel and the rake surface, where the rake surface is farthest from the proximal end.

FIG. 14 is a side view of head embodiment 720 which has certain features of the invention. Head 720 is a plain cylinder and lacks any filament holes or filaments during use. The head comprises a cylindrical shank 724 and a larger portion which is a constant diameter mid-body/tip 732. The distal surface 730 and the proximal surface 732 of the shank are inclined. The abrupt change in diameter between the two portions is an inclined surface 755. Head 720 might be used where the object was simply to push an object along the duct or to get the end of the shank to the distal end of a duct, so the shaft that is thereby positioned with the duct might be used for purpose other than rotating and moving the head— for example to pull a lanyard or other device back through the duct.

While the foregoing and other head embodiments of the present invention are preferably made of steel or aluminum alloy or strong plastic and is one integral piece, in the generality of the invention a head may be comprised of a shank, mid-body and tip, one or more of which portions is a separate element that is fastened to the other element(s).

FIG. 15 is a side view of head 70 which has comprises a multiplicity of wire or non-metal bristles 72 which extend radially outwardly from a mid-body which is a spiral wound-wire core 74, a configuration familiar for bottle and tube brushes as well as stove pipe sweeps. The brush portion is substantially cylindrical, but in other embodiments there is an uneven, tapered or other-shape exterior surface. Head 70 comprises a distal end tip and a proximal end collar. Tip 78 is a disk like piece attached to the wire wound core, and provides head 70 with a rake inclined surface distal end. Collar 78 is secured to the wire core to form the proximal end of the head body, where is attached shaft 22. Collar 78 presents an inclined rake surface at the proximal end. The rakes at the distal and proximal end of head 70 serve the same purposes as described above for heads that comprise filaments.

FIG. 16 is a partial side view, exploded, of head 170 which is mostly like head 70. Head 170 comprises a cylindrical tip, namely cap 178, which provides the head with an inclined distal end rake surface when the cap is mated to the integral wire loop 80 which is the distal end of the core 174 of the brush head 170. (Such a wire loops is familiar in prior art brushes used for cleaning ducts and the like.) The cap is secured to the loop 80 by means of one or more of a fastener, latch, or frictional/spring engagement means, etc., not shown. The proximal end of head 170 may have a collar like that of head 70.

A brush type head of the kind shown in FIG. 15 and FIG. 16 may be pushed or pulled along the length of a duct without rotation to clean the duct, if desired. And if the head then hangs up, the mechanic can the rotate the head slowly by means of the shaft, while simultaneously thrusting the shaft/head lengthwise along the duct. The result will be that the inclined surface at the end of the head where there was the hang up will cause the head to climb the step.

FIG. 17-23 show couplings which are adaptations of couplings shown in certain Figures of U.S. patent application Ser. No. 14/810,172, filed Jul. 29, 2015 by the applicant/inventor here, the disclosure of which is hereby incorporated by reference in its entirety. The couplings are preferably made of a corrosion resisting metal; optionally, they are made of strong plastic material. The terms coupling and coupler are used interchangeably herein.

Figure 17:
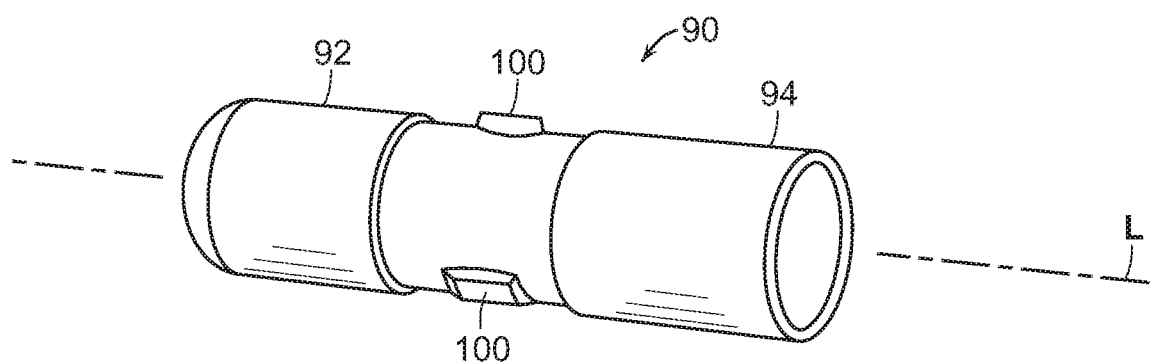
FIG. 17 is a perspective view of a coupling comprising mated first fitting and second fitting.
Figures 18, 19:
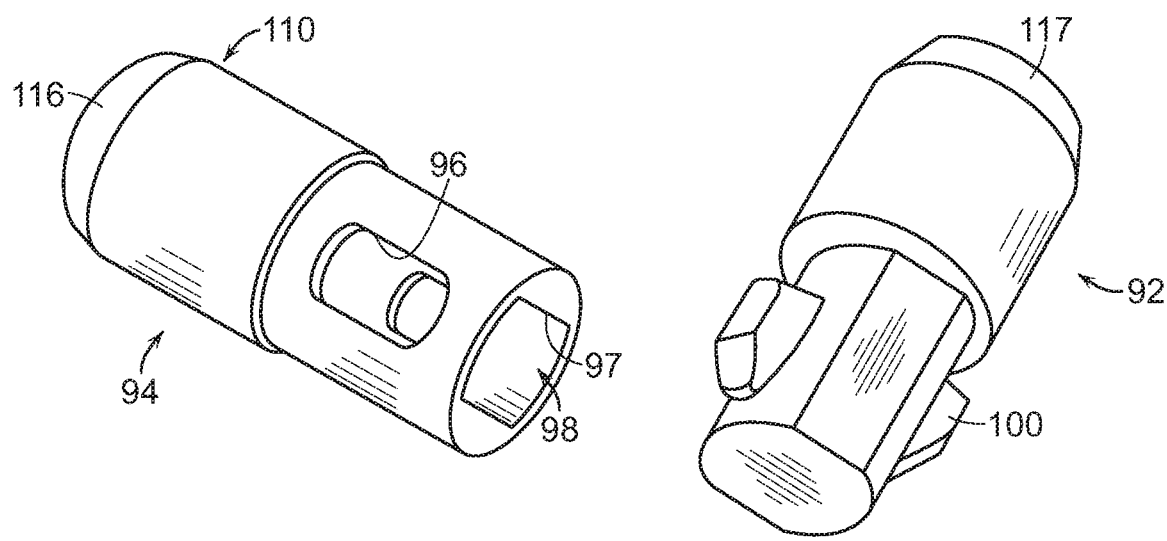
FIG. 18 is a perspective view of the second fitting to the coupling of FIG. 17.
FIG. 19 is a perspective view of the first fitting to the coupling of FIG. 17.
Figure 20:
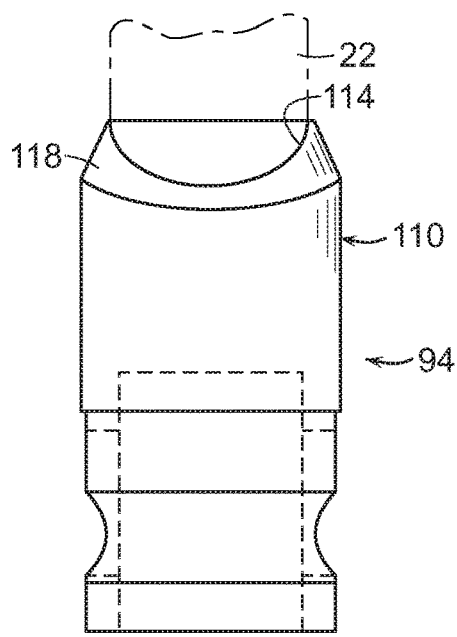
FIG. 20 is a side view of the fitting in FIG. 18.
Figure 21:
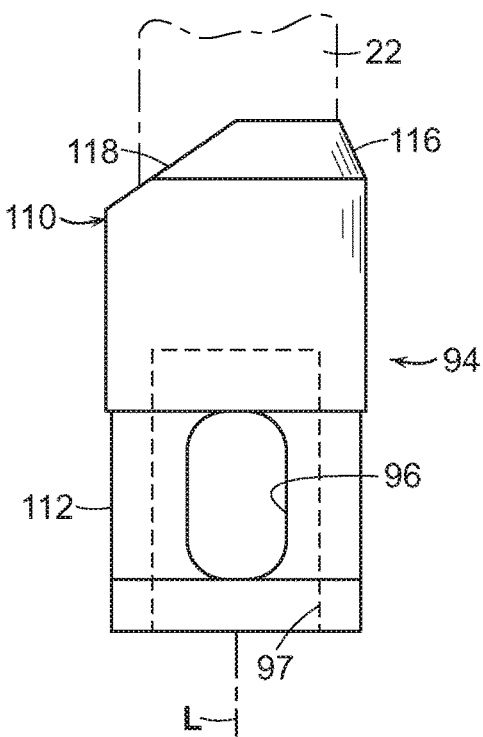
FIG. 21 is a side view of the fitting in FIG. 18 which is at right angle to the view of FIG. 20.
Figure 22:
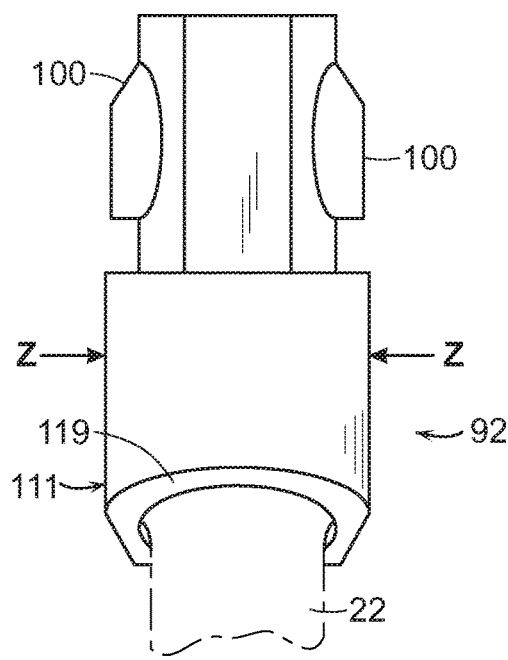
FIG. 22 is a side view of the fitting in FIG. 19.
Figure 23:
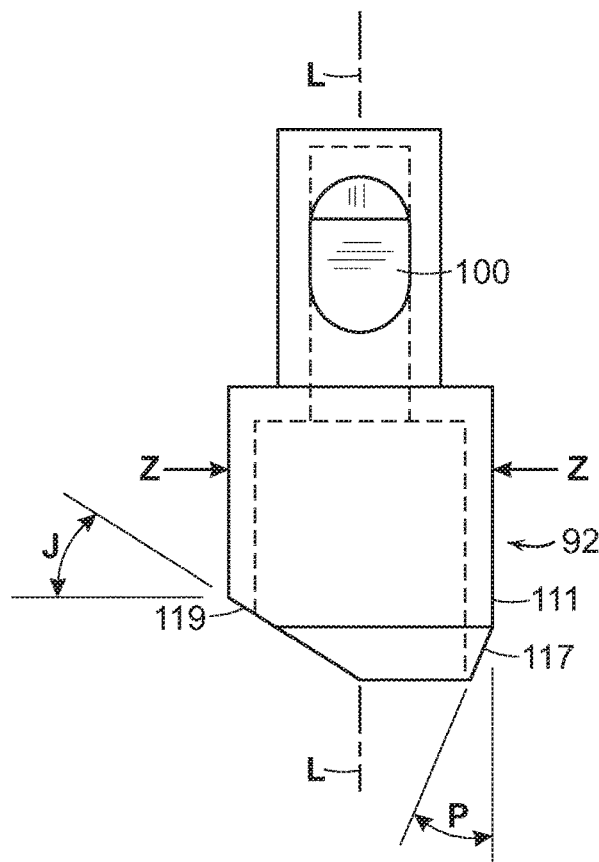
FIG. 23 is a side view of the fitting in FIG. 22 which is at right angle to the view of FIG. 22.

FIG. 17 shows an assembled coupling 90. Coupling 90 is an illustrative embodiment of the current invention and other two-part couplings may have proximal end features of the present invention and thus be within the scope of claims. FIG. 19 shows first part (fitting) 92 that has a distal end (male end) which is received within the open cavity 98 of second part (fitting) 94 that is shown in FIG. 18. When the fittings are mated as shown in FIG. 17, spring loaded buttons 100 of first fitting 92 project through opposing side openings 96 of second fitting 94, locking the fittings together against axial and torsional forces. At least one flat 97 aids in the torsional force resistance. FIG. 20 shows a side view of fitting 94 and FIG. 21 shows another side view at 90 degree angle to the first view. FIG. 22 and FIG. 23 are analogous views of first fitting 92.

Fitting 92 has a body with a shank portion 111 which is the proximal end, an opposing distal end which is the tip and a mid-body portion which contains spring loaded buttons 100. Fitting 94 has a body with a shank portion 110 which is the proximal end, an opposing a distal end 112 which is the tip. Shank portion 110 has a bore 114. The shank end of each fitting is shaped with a bore to receive a circular cross section shaft 22, shown in phantom. With reference to FIG. 22, 23, fitting 92 has a bevel 117 at the proximal or shank end, which bevel is preferably a conical section centered on the lengthwise axis L of the fitting. The proximal end of fitting 92 further comprises rake 119, the surface of which lies in a plane. An exemplary bevel lies at an angle P of nominally 20 degrees to the lengthwise axis. Angle P may range from 10 to 30 degrees, optionally to 45 degrees. An exemplary rake has a surface which lies at an angle J of nominally 30 degrees to a plane perpendicular to the lengthwise axis. With reference to FIGS. 20, 21 fitting 94 has a proximal/shank end that is similarly configured: End 110 has a bevel 116 and an associated rake 118. The surfaces of rakes 118, 119 are preferably flat planes as shown, but in accord with what is described above for heads, the surfaces 118, 119 may vary while lying along a plane.

After insertion of the shaft into a shank the shank is swaged by inward force illustrated by arrows Z, so the shank is deformed, thereby holding the shank onto to the rod.

In the embodiments of FIG. 20 to FIG. 24, the rake of each fitting runs only to about the center plane of the fitting, compared to running all the way across the proximal end. Having that feature lessens the portion of the shank which is deformed radially inwardly by common swaging dies; and it avoids what otherwise would be a rake that creates a shank tapering toward nothingness, where it could be fragile. The truncated rake configuration also helps make swaging attachment of the fitting to a shaft. Particularly when the shaft is made of deformable plastic, conventional swaging technique could result in a tendency for the fitting to be cocked with respect to alignment with the length axis of the shaft, due to a long tapered portion. Truncation eliminates that tendency. While other techniques might be employed, such as machining an end-bore relief or reducing the exterior diameter of the tapering-to-nothing portion, they require additional fabrication of the shank.

In the generality of the invention, other means may be used for attaching a shaft to the shank, including adhesives and fasteners; and, alternatively the shank may comprise lengthwise structure, such as a pin which is captured within the rod material.

Referring to the above, by way of describing the foregoing coupling aspect of the invention in alternative terms: A coupling comprises a first fitting and a second fitting that mate with each other. Each fitting has a proximal end comprising a shank, a mid-body portion, and a distal end comprising a tip. The distal end and mid-body portion of one fitting are shaped to receive or to be received within the distal end and mid-body portion of the other fitting. The proximal end of at least one of the fittings, preferably of both of the fittings comprises a rake, the surface of which runs at an oblique angle to the longitudinal axis. In embodiments, a rake extends only to the vicinity of the longitudinal axis.

Figure 24:
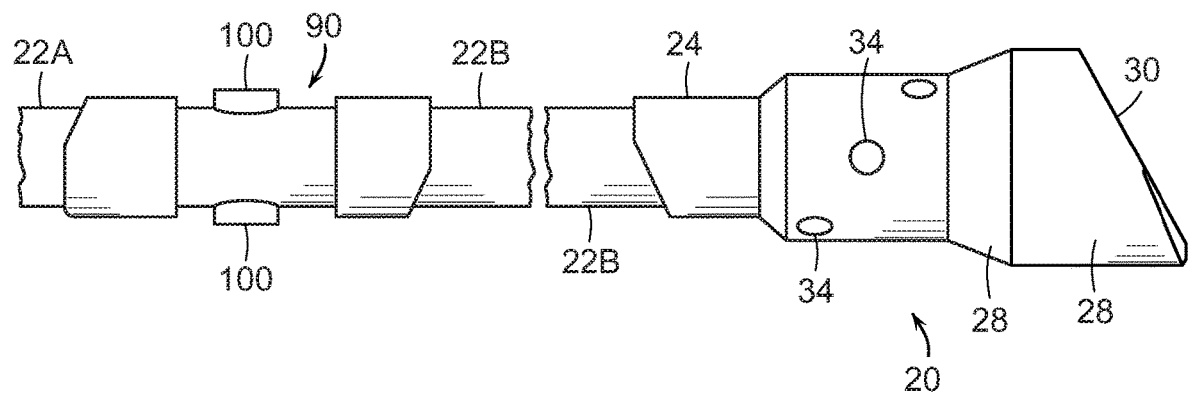
FIG. 24 is a side view of an assembly comprising a head and coupler, interconnected by shaft portions.

FIG. 24 shows an assembly comprising shaft sections, a coupler and a head 20. Each fitting of coupler 90 is respectively fastened to shaft sections 22A and 22B and has a shank rake as described just above. Head 20 is secured to shaft 22B at shank 24 which has a proximal end rake similar that to the shanks of the coupler fittings. Thus the head may be rotated and moved lengthwise by appropriate force applied to shaft section 22A or some other shaft section that is coupled to it.

In the method of using the invention, a head as described may be attached to the end of any shaft, and while the shaft and thus the head is rotated, the head is pushed and or pulled lengthwise within a duct. Preferably, the method involves using a shaft with a coupling comprising one or more rake distal end. Alternatively, a coupling comprising one or more rake distal end may be used with any kind of head, compared to using the coupling as described in combination with the invention head. Couplings, other than those described herein may be shaped with rake distal ends having the various additional other features which have been described.

While the invention has been described for cleaning ducts which are adapted to carry air, the invention may be used in other ducts or conduits which are adapted for carrying other fluids, or are adapted for other purposes.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A device for cleaning a duct, useful either as a whip head or as a first coupler fitting when the device is attached to a first flexible shaft that rotates the device and moves the device longitudinally within said duct, the device comprising:
    a body having
    a longitudinal axis;
    a proximal end;
    a distal end, spaced apart along a longitudinal axis from the proximal end;
    a mid-body portion; and,
    a shank portion, to the mid-body portion and extending to the proximal end of the device; the shank portion comprising
    a bore centered on and extending along the longitudinal axis at said proximal end, the bore configured for receiving an end of said first flexible shaft;
    and a first rake, at said proximal end, the rake extending partially or fully across the shank portion along a plane that runs at an oblique angle to the longitudinal axis.

2. The device of claim 1 further comprising: a flexible shaft having an end positioned within said bore and attached to the body.

3. A device of claim 1 configured as a first coupler fitting in combination with a second coupler fitting, said first coupler fitting and said second coupler fitting configured for mating with each other as an assembly to form a coupler; the second coupler fitting comprising a body, a proximal end and a distal end spaced apart along a longitudinal axis; the body comprising a mid-body portion and a shank portion connected to the mid-body portion, the shank portion comprising the proximal end of the second coupler fitting and configured for attaching second coupler fitting to a second shaft;
    wherein the distal end of the first coupler fitting and the distal end of the second coupler fitting are disengagingly mated with each other as said assembly to thereby forming said coupler.

4. A device for cleaning a duct, useful as a whip head when attached to a first shaft that rotates the device and moves the device longitudinally within said duct, the device having a body, a proximal end and a distal end spaced apart along a longitudinal axis, wherein
    the body comprises:
    a mid-body portion; and,
    a shank portion, connected along the longitudinal axis to the mid-body portion, the shank portion comprising the proximal end of the device configured for attachment to said first shaft; the shank portion comprising a first rake at said proximal end, the first rake comprising a surface that extends partially or fully across the shank portion along a plane that runs at an oblique angle to the longitudinal axis;
    wherein the mid-body portion is configured to hold a plurality of filaments that extend radially outward from the mid-body when the device is rotated;
    further comprising a tip portion connected along the longitudinal axis to the mid-body portion, the tip portion comprising a second rake which is at said distal end of the device, the second rake comprising a surface that extends partially or fully across the tip portion along a plane that runs at an oblique angle to the longitudinal axis.

5. The device of claim 4 wherein the tip portion has a substantially cylindrical exterior surface at the location where the tip connects to the mid-body, the cylindrical exterior surface running to the second rake surface, thereby forming a nominally circular intersection with said second rake surface; further comprising a bevel running around half or less of said intersection.

6. The device of claim 5 wherein the tip portion further comprises a flat running substantially perpendicular to the longitudinal axis, the flat intersecting both the bevel and the second rake surface at the portion of the tip portion which is farthest from the proximal end.

7. The device of claim 4 wherein the second rake surface extends across only a portion of the distal end of the device.

8. The device of claim 4 wherein the surface of the second rake surface is an uneven surface that has a best fit plane which runs at said oblique angle.

9. The device of claim 4 where the second rake is inclined relative to the longitudinal axis at an angle which is in the range of 30 to 50 degrees.

10. A device for cleaning a duct, useful either as a whip head or as a first coupler fitting when attached to a first shaft that rotates the device and moves the device longitudinally within said duct, the device having a body, a proximal end and a distal end spaced apart along a longitudinal axis, wherein the body comprises:
    a mid-body portion; and,
    a shank portion, connected along the longitudinal axis to the mid-body portion, the shank portion comprising the proximal end of the device configured for attachment of said first shaft; the shank portion proximal end comprising a first rake that extends partially or fully across the shank portion along a plane that runs at an oblique angle to the longitudinal axis;
wherein the first rake is inclined relative to the longitudinal axis at an angle which is in the range of about 20 to about 45 degrees.

11. A device for cleaning a duct, useful either as a whip head or as a first coupler fitting when attached to a first shaft that rotates the device and moves the device longitudinally within said duct, the device having a body, a proximal end and a distal end spaced apart along a longitudinal axis, wherein the body comprises:
a mid-body portion; and,
a shank portion, connected along the longitudinal axis to the mid-body portion, the shank portion comprising the proximal end of the device configured for attachment of said first shaft; the shank portion proximal end comprising a first rake that extends partially or fully across the shank portion along a plane that runs at an oblique angle to the longitudinal axis;
wherein the mid-body portion comprises a wire-wound core holding a plurality of brush filaments that extend radially outward from the body; the body further comprising a tip portion connected along the longitudinal axis to the mid-body portion, the tip portion comprising a second rake that forms the distal end of the device, the second rake comprising a surface that extends partially or fully across the tip portion along a plane that runs at an oblique angle to the longitudinal axis.

12. An assembly for use in cleaning a duct, comprising:
a first shaft and a second shaft, the shafts connected by a coupler; and, a whip head connected to the end of either the first shaft or to the end of the second shaft;
wherein the whip head comprises a proximal end and a distal end spaced apart along a longitudinal axis, and a body comprising:
a mid-body portion configured to hold a plurality of filaments that extend radially outward from the body when the body is rotated;
a shank portion connected along the longitudinal axis to the mid-body portion and extending to the proximal end of the whip head, the shank portion attached to either an end of the first shaft or an end of the second shaft; and,
a tip portion connected to the mid-body portion, the tip portion comprising a rake which comprises a surface that extends partially or fully across the tip portion along a plane that runs at an oblique angle to the longitudinal axis at the distal end of the whip head;
wherein the coupler comprises a first coupler fitting and a second coupler fitting disengagingly mated to each other, each coupler fitting having a longitudinal axis, a shank portion proximal end, a mid-body portion, and a distal end; wherein the distal end and the mid-body portion of the first coupler fitting are shaped to receive, or to be received within, the distal end and mid-body portion of the second coupler fitting; and,
wherein the proximal end of either one or both coupler fittings comprises a rake comprising a surface that extends partially or fully across the shank portion of the coupler fitting along a plane that runs at an oblique angle to the longitudinal axis.

13. The assembly of claim 12 wherein the shank portion of the whip head has a rake at the proximal end, the rake comprising a surface that extends partially or fully across the shank along a plane that runs at an oblique angle to the longitudinal axis.

14. The assembly of claim 12 wherein the rake surface at the proximal end of said either one or both coupler fittings is inclined relative to the longitudinal axis of the fitting at an angle which is in the range of about 10 to 30 degrees.

15. An assembly of first coupler fitting and second coupler fitting, for use in connecting a first shaft and a second shaft and for transmitting rotary motion therebetween,
the first coupler fitting being a device having a body, a proximal end and a distal end spaced apart along a longitudinal axis, wherein the body comprises
a mid-body portion; and,
a shank portion, connected along the longitudinal axis to the mid-body portion, the shank portion comprising the proximal end of the device and configured for attachment of and end of the first shaft; the shank portion proximal end comprising a first rake that extends partially or fully across the shank portion along a plane that runs at an oblique angle to the longitudinal axis;
the second coupler fitting comprising a body, a proximal end and a distal end spaced apart along a longitudinal axis, where the body comprises
a mid-body portion; and
a shank portion, connected along the longitudinal axis to the mid-body portion, the shank portion comprising the proximal end of the second coupler fitting and configured for attachment of an end of the second shaft;
wherein the proximal end of the second coupler fitting has a rake comprising a surface extending partially or fully across the shank portion along a plane that runs at an oblique angle to the longitudinal axis; and
wherein, the distal end of the first coupler fitting and the distal end of the second coupler fitting are disengagingly mated with each other.

16. The assembly of claim 15 wherein the body of the first coupler fitting or the body of the second coupler fitting comprises one or more spring loaded radially-extending buttons for engagingly and releasably attaching the first coupler fitting to the second coupler fitting.

17. The assembly of claim 15 further comprising a first shaft attached to the shank portion of the first coupler fitting and a second shaft attached to the shank portion of the second coupler fitting.

18. The assembly of claim 17 further comprising a whip head, the whip head having a proximal end and a distal end spaced apart along a longitudinal axis, the whip head having a body comprising:
a mid-body portion configured to hold a plurality of filaments that extend radially outward from the body when the whip head is rotated;
a shank portion, connected along the longitudinal axis to the mid-body portion, the shank portion attached at said proximal end to either the first shaft or the second shaft; and,
a tip portion, connected to the mid-body portion and extending to the distal end of the whip head, the tip portion having a rake which comprises a surface that extends partially or fully across the tip portion along a plane that runs at an oblique angle to the longitudinal axis.

* * * * *

UNITED STATES PATENT AND TRADEMARK OFFICE
CERTIFICATE OF CORRECTION

| | | |
|---|---|---|
| PATENT NO. | : 11,407,014 B2 | Page 1 of 1 |
| APPLICATION NO. | : 16/171319 | |
| DATED | : August 9, 2022 | |
| INVENTOR(S) | : Gregory Lee Newth | |

It is certified that error appears in the above-identified patent and that said Letters Patent is hereby corrected as shown below:

In the Claims

Column 11 Claim 1, Line 12, insert --connected-- after "shank portion,"

Signed and Sealed this
Twenty-eighth Day of February, 2023

Katherine Kelly Vidal
*Director of the United States Patent and Trademark Office*